United States Patent
Hu et al.

(10) Patent No.: US 8,718,653 B2
(45) Date of Patent: May 6, 2014

(54) METHOD AND TERMINAL FOR ASSOCIATION UPDATE

(75) Inventors: Ying Hu, Shenzhen (CN); Jinguo Zhu, Shenzhen (CN); Zaifeng Zong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 160 days.

(21) Appl. No.: 13/002,759

(22) PCT Filed: Jul. 8, 2009

(86) PCT No.: PCT/CN2009/072679
§ 371 (c)(1),
(2), (4) Date: Jan. 5, 2011

(87) PCT Pub. No.: WO2010/003374
PCT Pub. Date: Jan. 14, 2010

(65) Prior Publication Data
US 2011/0117931 A1 May 19, 2011

(30) Foreign Application Priority Data
Jul. 10, 2008 (CN) .......................... 2008 1 0130573

(51) Int. Cl.
*H04W 36/00* (2009.01)
(52) U.S. Cl.
USPC ........ 455/444; 455/456.1; 455/436; 455/448; 455/422.1; 455/435.1
(58) Field of Classification Search
USPC .......... 455/456.1, 436, 448, 422.1, 435.1, 444
See application file for complete search history.

(56) References Cited

U.S. PATENT DOCUMENTS

| 2008/0004014 A1 | 1/2008 | Palviainen |
| 2009/0258671 A1 * | 10/2009 | Kekki et al. ................ 455/552.1 |

FOREIGN PATENT DOCUMENTS

| CN | 1997224 A | 7/2007 |
| WO | 2008004152 A2 | 1/2008 |
| WO | 2008033951 A2 | 3/2008 |

OTHER PUBLICATIONS

Supplementary European Search Report in European application No. 09793849.2, mailed on Mar. 5, 2012.

(Continued)

*Primary Examiner* — Justin Lee
(74) *Attorney, Agent, or Firm* — Oppedahl Patent Law Firm LLC

(57) ABSTRACT

A method and terminal for association update are provided. When the terminal performs location area update to a MSC/VLR via a GERAN/UTRAN, if it has performed combined update or CSFB attachment in an EPS network via E-UTRAN, then it sets a combined update indication which indicates the EPS network requires combined update when the terminal returns to the E-UTRAN from the GERAN/UTRAN; when the terminal moves to a registered tracking area of the E-UTRAN, it determines whether the combined update indication has been set or not, if yes, it initiates combined TAU and LAU to an MME. After receiving a location update request from the MME, the MSC/VLR updates stored association information and re-establishes SGs association with the MME. Accordingly, a terminal has a control module for association update, which comprises a combined update indication setting determination unit, a combined update setting unit and a combined update initiation determination unit. The present invention enables to update the SGs association in the MSC/VLR in time, thereby the MSC/VLR can always find UE through paging.

10 Claims, 5 Drawing Sheets

(56) References Cited

OTHER PUBLICATIONS

English Translation of International Search Report for international application No. PCT/CN2009/072679, mailed on Oct. 15, 2009.
English Translation of the Written Opinion of the International Search Authority in international application No. PCT/CN2009/072679, mailed on Oct. 15, 2009.
English Translation of International Preliminary Report on Patentability for international application No. PCT/CN2009/072679, mailed on Jan. 11, 2011.
Technical Specification Group Services and System Aspects, Jun. 1, 2008.
CS Fallback with ISR, 3GPP Draft, May 16, 2008.
Discussion one Scenario of CSFB interaction with ISR, 3GPP Draft, Aug. 19, 2008.

* cited by examiner

METHOD AND TERMINAL FOR ASSOCIATION UPDATE

TECHNICAL FIELD

The present invention relates to the field of communications, particularly to a method and terminal for association update.

BACKGROUND

At present, a standardization working group of the 3$^{rd}$ Generation Partnership Project (3GPP) is dedicated to the research on the evolution of packet switched core network (PS-CN) and universal mobile telecommunication system terrestrial radio access network (UTRAN), for the purpose of enabling the evolved PS-CN to provide higher transmission rate and shorter transmission delay, and supporting mobility management among evolved UTRAN (E-UTRAN), global system for mobile communications enhanced data rate for GSM evolution radio access network (GERAN), UTRAN, wireless local area network (WLAN) and other non-3GPP access networks. This evolved mobile telecommunication system is called evolved packet system (EPS). FIG. 1 is an architecture diagram of the EPS system, which only illustrates some of entities related to the present invention. The entities in FIG. 1 are described as below.

Mobile station (MS)/user equipment (UE) 101: in the subsequent descriptions, the MS/UE is uniformly expressed with UE, and is also called a terminal. A terminal with the capability of accessing two kinds of wireless networks is called a dual-mode terminal. A terminal with the capability of accessing multiple kinds of wireless networks is called a multi-mode terminal. In the subsequent descriptions, the UE is a dual-mode terminal or a multi-mode terminal accessible to global system for mobile communication (GSM)/universal mobile telecommunication system (UMTS) and EPS network.

E-UTRAN 102 is an evolved radio access network, which can provide higher uplink/downlink rate, shorter transmission delay and more reliable wireless transmission. The network element contained in the E-UTRAN is evolved NodeB (eNodeB), and the E-UTRAN provides radio resources for terminal access.

Serving gateway (S-GW) and packet data network gateway (PDN GW or P-GW) 103: the S-GW is a user plane entity which is responsible for user plane data route processing. The P-GW is responsible for the gateway function of the UE accessing a packet data network (PDN). The P-GW and S-GW may be implemented in one physical entity as shown in FIG. 1, or in separate physical entities.

Mobility management entity (MME) 104 is a control plane entity and a server for temporary storage of UE/user data, which is responsible for managing and storing the context of the UE (e.g. UE/user ID, mobility management status, UE security parameter, etc.), distributing a temporary ID for a UE/user, and authenticating this UE/user when the UE currently camps on this tracking area or network managed by it.

Internet protocol (IP) multimedia subsystem (IMS) is an IP-based network architecture put forth by 3GPP. It establishes an open and flexible service environment, supports multimedia application and provides rich multimedia services for users. The IMS is an IP-based telecom network architecture and is irrelevant with access technologies. In addition to providing services for the EPS, general packet radio service (GPRS), WLAN and other packet access networks, it may also provide services for the GSM, UMTS and other mobile cellular networks.

GERAN/UTRAN 105 is radio access network for legacy GSM/UMTS network.

Mobile switching center (MSC)/visitor location register (VLR) 106 are two logically separate units, which are typically implemented in one physical node. The MSC/VLR may also be a new functional entity, MSC Server, since 3GPP R4 (Release 4) stage. In the present invention, all are uniformly expressed with the MSC/VLR.

Gateway mobile switching center (GMSC) 107 is included. Serving GPRS support node (SGSN) 108 is a control network element of the GPRS network, its main roles are to record location information of the UE(s), and forward mobile packet data between the UE and a gateway GPRS supporting node (GGSN).

When the UE camps on the GSM/UMTS network, user's basic voice services, short message services and supplementary services based on voice services will be provided through a circuit switching (CS) domain. The MSC/VLR and the GMSC in FIG. 1 are network elements belonging to the CS domain. Via the CS domain, a user may perform a voice call and other services with users in the same network or other networks (e.g. fixed telephone network and other mobile networks). IP services are provided to the users via the packet switching (PS) domain. The SGSN in FIG. 1 is a network element belonging to the PS domain. UE(s)/Users access the PDN via the PS domain. The operator's IP service network in FIG. 1 is a PDN.

In the GSM/UMTS network, the UE may perform CS and PS update and/or attachment separately to access CS and PS domains. When the UE initiates the CS and PS update and/or attachment separately, it sends request messages of Location Area(LA) Update (LAU) and Routing Area (RA) Update (RAU) to the GERAN/UTRAN (GERAN or UTRAN) respectively. After receiving the LAU request message, the GERAN/UTRAN will send the LAU request message to the MSC/VLR via an A/Iu-CS interface. After receiving the LAU request message, the MSC/VLR will initiate a process of CS domain update and/or attachment. After receiving the RAU request message, the GERAN/UTRAN will send the RAU request message to the SGSN via a Gb/Iu-PS interface. The SGSN will initiate a process of PS domain update and/or attachment after receiving the RAU request message. The method of separately performing update and/or attachment to the CS domain and the PS domain requires separate radio resources and signaling.

In order to reduce mobility management signaling overhead and radio resource occupation, in the GPRS, Gs interface is introduced between MSC/VLR and SGSN. The Gs interface is used for the establishment of the Gs association between the MSC/VLR and the SGSN (i.e., the SGSN stores the VLR number and the VLR stores the SGSN number). If the Gs association exists, the MSC/VLR will page the called UE which is in an idle state via the PS domain.

The Gs association is established in combined RA/LA Update (or attach/LAU). The combined RA/LA Update (or attach/LAU) is that when a UE which supports simultaneous attachment to the CS domain and PS domain of the GSM/UMTS network performs a RAU (or attach) in the PS domain, the UE includes an indication in the RAU (attach) message; when the SGSN performs the RAU (attach), if it determines that the network supports the Gs interface, then the SGSN sends a location update message to the MSC/VLR to trigger a CS location update procedure. As such, a CS LAU procedure was completed during a PS domain RAU procedure.

Once the combined RA/LA Update (or attach/LAU) is completed, the Gs association will be established between the SGSN and the MSC/VLR.

When the MSC/VLR receives a LAU request message from the A/Iu-CS interface, Gs association information will be deleted from the MSC/VLR, and the current location area information of the UE in CS domain will be stored in the MSC/VLR.

After the UE has attached in the CS domain and PS domain of the GSM/UMTS network and the Gs association has been established, the MSC/VLR will execute paging for CS services via the SGSN. For example, when the UE is called, that is a mobile terminating call is performed, the MSC/VLR sends a paging request message for CS service to the SGSN via the Gs interface, if the state of the UE in the MSC/VLR is in idle state in the CS domain. After the SGSN receives the paging request message for CS service, it will initiate a CS paging procedure and transfer the paging message for CS service to the UE. After receiving the paging message for CS service, the UE will send a CS paging response message to the MSC/VLR. Once the CS paging response message is received, a call establishment procedure will be executed between the MSC/VLR and the UE. After the call is established, the user of the UE can start a conversation with the user who has initiated the call.

It should be noted that whether the UE supports combined RA/LA Update (or attach/LAU) or not is optional. Based on the capability of simultaneously working in the CS domain and PS domain, the UE may be classified into three categories of terminals: Class A, Class B and Class C, where only Class A terminal and Class B terminal support combined RA/LA Update (or attach/LAU). Whether the SGSN and/or the MSC/VLR support the Gs interface or not is also optional. Some of MSC/VLR and/or SGSN products don't support the Gs interface, so in some GSM/UMTS networks, the CS domain and PS domain may exist at the same time but no Gs interface is deployed in the network. In this case, the UE will perform update and/or attachment separately in the CS domain and PS domain. The CS service paging is performed via the A/Iu-CS interface.

In the GSM/UMTS network, when the MSC/VLR performs a mobile terminating call, if the MSC/VLR determines that there are ongoing CS services with the UE via the A/Iu-CS interface (that is, the UE is currently in connected mode in the CS domain), then the MSC/VLR interacts with the UE directly via the existing signaling connection of the A/Iu-CS interface without paging the UE. Otherwise, in the case there is no signaling connection between the MSC/VLR and the UE (that is, the UE is in the idle state in the CS domain), the MSC/VLR will page the UE. When there is the Gs association existing between the MSC/VLR and the SGSN, the MSC/VLR executes the CS service paging via the Gs interface; and when there is no Gs association existing between the MSC/VLR and the SGSN, the MSC/VLR executes the CS service paging via the A/Iu-CS interface.

When the UE camps on the EPS network via E-UTRAN, users' basic voice services and the supplementary services based on the voice services are provided and controlled by the IMS. The EPS system per se can not provide and control voice call services and can only provide transmission for IP data. However, during initial EPS network deployment, some operators, without deploying an IMS, may deploy EPS networks in key or hot spots where the GSM/UMTS coverage is also available. In this scenario, it is hoped that voice call services can be provided through and only through the CS domain of overlapped GSM/UMTS coverage. When the UE camps on the E-UTRAN, the UE cannot camp on the GSM/UMTS network, since the UE is single radio and it can only turn on one radio transmitter/receiver (either GSM/UMTS or Long Term Evolution(LTE)) at one time because of interference etc. So the UE cannot receive CS service paging or initiate the CS service via the GSM/UMTS network when it is camped on the LTE, thus users are unable to execute voice calls, short messages and other CS services. In order to enable CS services in such scenario, 3GPP has set up a CS Fallback (CSFB) task to work out a solution.

The current CSFB solution: SGs interface is introduced between MME and MSC/VLR. The SGs is extended based on the Gs interface. When the UE camps on the EPS network via the LTE network, the UE initiates CSFB attachment or combined TA (Tracking Area) /LA Update, and a SGs association is established between the MME and the MSC/VLR (i.e. the MME stores the MSC/VLR number or address information, and the MSC/VLR stores the MME number or address information). Subsequently, when the UE moves around within LTE coverage, the latest location information of the UE is updated to the MME. If location area or the MME changes, then the information stored in the MSC/VLR is updated, too.

When the MSC/VLR receives a LAU request message from the A/Iu-CS interface, SGs association information will be deleted, and the MSC/VLR stores the location area information of the UE in CS domain.

When CS services, e.g. a mobile terminating voice call, are processed, if the UE of a called user is camped on LTE coverage, then the MSC/VLR, after receiving the call, sends a CS paging message to the MME via the SGs interface. Once receiving the CS paging message, then the MME sends CS paging to the UE via the E-UTRAN. Once the UE received the paging for CS services, the fallback procedure will be initiated. After the fallback is finished, the UE will camp on the CS domain of the GSM/UMTS network and send a CS paging response message to the MSC/VLR. After receiving the response message, the MSC/VLR will start establishing the call and the conversation.

Before introduction of idle-mode signaling reduction (ISR), in the case there are CS services, the MSC/VLR can always find the UE by paging based on the SGs, Gs or A/Iu-CS information stored in the MSC/VLR. After the ISR is introduced, in the case that the SGs interface is supported between the MSC/VLR and the MME for the purpose that the CSFB function is supported, while the Gs interface is not supported between the SGSN and the MSC/VLR and/or a UE does not support combined RA/LA Update and that ISR is activated, when the UE camp on the EPS network, the MSC/VLR will be unable to find the UE by paging during the CS services procedures in the scenario as shown in FIG. 2 according to the current technology. ISR-related concepts will be introduced and existing problems will be described hereinafter with reference to FIG. 2.

The ISR is a mechanism to limit signaling resulting from cell-reselection between radio access technologies performed by the UE when it is in an idle mode. When the UE is in an idle mode in an area overlapped by both the GSM/UMTS network and the LTE network, it may frequently switch between GSM/UMTS and LTE access modes due to movement or changes of the intensity of radio signals or other reasons. Frequent RAU (the procedure of the UE location updating in the PS domain of the GSM/UMTS network) and TAU (the procedure of the UE location updating in the EPS network) will lead to too much signaling interactions with the network. In order to reduce the signaling load on network brought about by the above-mentioned RAU/TAU, the main idea of the ISR solution in 3GPP is that when both the UE and networks support the ISR function, context information of the UE will be stored in both the SGSN and MME, and registration information from these two networks is also stored in the UE. In this way, subsequently, when the UE switches accessing between the networks, there will be no need for TAU or RAU. In other words, subsequently, when the UE moves between the GSM/UMTS and LTE networks, if the current routing area of UE (UE location information in the PS domain of the GSM/UMTS network) has been registered and the current tracking area of the UE (UE location information in the EPS network) is in the lists of tracking area that the UE registered with the network, then the UE will not initiate the RAU and the TAU. Therefore, when there is no signaling connection between the UE and networks, the networks will not know whether the UE is camped on the LTE network or the GSM/UMTS network at the moment.

ISR activated refers to the case that UE is simultaneously registered in the EPS and GSM/UMTS PS networks. The UE keep valid registration information of the EPS and GSM/UMTS PS networks and an ISR activated flag is set in the UE context, meanwhile, both the MME and the SGSN store the UE registration information, and the ISR activated flag is set in the UE's context in them respectively. ISR non-activated refers to the case that either the MME or the SGSN will store the registration information of the UE, the UE will only have registration information of one access network, either LTE network or GSM/UMTS, in this case.

FIG. 2 is a schematic diagram illustrating the problems occurring when the MSC/VLR executes CS services paging. Under the network deployment scenario as shown in FIG. 2, the SGs interface is supported between the MSC/VLR and the MME, while the Gs interface is not supported between the SGSN and the MSC/VLR, the UE and networks support the ISR, and moreover, the ISR has been activated for the UE.

In the first step as shown in FIG. 2, the UE camps on the EPS network, and performs a CSFB attachment or combined TA/LA Update procedure. The CSFB attachment is that the UE sends an attachment request message containing CSFB indication information to the EPS, and after the MME receives the attachment request message, the MME will perform an EPS attachment procedure, meanwhile, the MME will send a location update request message to the MSC/VLR to complete the update procedure of the UE in the CS domain. In this procedure, the MME generates a tracking area list based on the current tracking area identity (TAI) and other information of the UE/user and sends an attachment acceptance message containing the tracking area list to the UE. After the UE receives the attachment acceptance message, the UE will store the tracking area list and set an identity that indicates the UE has performed an update in the EPS network. After the CSFB attachment procedure is completed, the UE will have been registered in the EPS network and the GSM/UMTS CS domain, the VLR will store the corresponding MME information, the MME will store the corresponding MSC/VLR information, and the SGs association is established between the MSC/VLR and the MME. The combined TA/LA procedure is similar to the above CSFB attachment procedure, so it will not be described in detail here.

In the second step as shown in FIG. 2, when the UE moves from the LTE access network to the GSM/UMTS network, due to the radio signal quality or other reasons, the UE will perform the cell reselection and camp on the GSM/UMTS network, as the Gs interface is not supported, the UE can not perform combined update but performs RAU and LAU separately. As shown in FIG. 2, the SGSN receives a RAU message from the Gb/Iu-PS interface, and the MSC/VLR receives a LAU message from the A/Iu-CS interface. During the RAU procedure, as the SGSN, the MME and the UE all support the ISR function, the ISR is activated, the MME remain the UE/user context and other data, the SGSN sends a RAU acceptance message including ISR activated information to the UE, and the UE sets that it has been registered in both the EPS network and the PS domain of the GSM/UMTS network. The UE now is registered in both the PS domain of the GSM/UMTS network and the EPS network, and ISR is activated. When the MSC/VLR receives the LAU message via the Mu-CS interface, the MSC/VLR will delete the SGs association, and only store the location information included in this location area update message.

Subsequently, when the UE moves from the GSM/UMTS network to the LTE network, as long as the current tracking area identity of the UE is in the list of tracking area identity that the UE registered with the network (i.e. stored in the UE's context), the UE does not initiate a TAU procedure, then in the MSC/VLR there is no SGs association information. If the user of the UE is called by other user, when the MSC/VLR needs to page the UE (i.e. the UE is in idle state in the MSC/VLR), as there is no SGs association in the MSC/VLR, the MSC/VLR will only page the UE in the GSM/UMTS network via the A/Iu-CS interface, and do not initiate CS paging in the EPS network via the SGs interface. However, since the UE can only camp on one access network (either the GSM/UMTS or the LTE) at a moment, the UE can not be found via paging in the CS domain of the GSM/UMTS network, the MSC/VLR is unable to find the UE through paging when the UE is camped on LTE access network. In other words, in this case, the user of the UE is unable to receive the CS call. So far, there is no available solution to solve the above problem.

SUMMARY

The technical problem that the present invention intends to solve is to provide a method for association update, which is capable of timely update the association in MSC/VLR, thereby the MSC/VLR can always find a UE via paging in a mobile terminating call procedure.

In order to solve the foregoing technical problem, the present invention provides a method for association update, the method comprises:

when a terminal (UE) performs location area update to a MSC/VLR via a GERAN/UTRAN, if the terminal has performed combined update or CSFB attachment in an EPS network via a LTE access network (i.e. an E-UTRAN), then it sets a combined update indication which indicates the EPS network requires combined update when the terminal returns to the E-UTRAN from the GERAN/UTRAN; and when the terminal moves to a registered tracking area of the E-UTRAN from the GERAN/UTRAN, the terminal determines whether the combined update indication which indicates the EPS network requires combined update has been set, if yes, then the terminal initiates combined TA/LA Update to a MME. After receiving a location update request from the MME, the MSC/VLR updates stored association information and re-establishes SGs association with the MME.

Further, the foregoing method may also have the following features:

when sending a location area update request message or after receiving a location area update acceptance message, the terminal may set the combined update indication which indicates the EPS network requires combined update when the terminal returns to the E-UTRAN from the GERAN/UTRAN.

Further, the foregoing method may also have the following features:

the terminal may set the combined update indication which indicates the EPS network requires combined update when the terminal returns to the E-UTRAN from the GERAN/UTRAN by using one or more new flags; or by expanding existing flags to include the combined update indication.

Further, the foregoing method may also have the following features:

the terminal, a GSM/UMTS and the EPS network may all support ISR function, and the ISR is activated;

SGs interface may be supported between the MSC/VLR and the MME; and

Gs interface may not be supported between the MSC/VLR and a SGSN, and/or the terminal may not support combined RA/LA Update.

Further, the foregoing method may also have the following features:

before the terminal performs the location area update, the terminal may set that it has registered and updated in the EPS network after completing CSFB attachment or combined TA/LA Update procedure in the EPS network, and may store tracking area list information generated by the MME; and after the terminal moves from the E-UTRAN to the GSM/UMTS network, it may perform the location area update to the MSC/VLR via the GERAN/UTRAN.

Further, the foregoing method may also have the following features:

before the terminal performs the location area update, the terminal completes CSFB attachment or combined TA/LA Update in the EPS network via the E-UTRAN; and subsequently, if the terminal (UE) falls back to CS domain of the GSM/UMTS network due to receiving CS service paging from the MSC/VLR via the SGs interface, and if the terminal needs to perform the location area update after falling back to the CS domain, the terminal may perform the location area update to the MSC/VLR via the GERAN/UTRAN.

Further, the foregoing method may also have the following features:

when the terminal moves to the E-UTRAN from the GERAN/UTRAN, the terminal may determine whether the combined update indication which indicates the EPS network requires combined update when the terminal moves to the E-UTRAN has been set or not, if yes, then the terminal may initiate combined TA/LA Update to the MME; if not, then the terminal may determine, based on other conditions, whether it is necessary to initiate combined TA/LA Update or not; or when the terminal moves to the E-UTRAN from the GERAN/UTRAN, firstly it may determine whether the current tracking area has been registered or not, if yes, then the terminal may determine whether the combined update indication which indicates the EPS network requires combined update when the terminal returns to the E-UTRAN from the GERAN/UTRAN has been set or not, if the combined update indication has been set, then the terminal may initiate combined TA/LA Update to the MME.

A terminal for association update provided by the present invention comprises a location area update module, a combined update module, a CSFB module and an ISR module, and the ISR module is activated. The terminal also comprises a control module for association update. This control module for association update further comprises a combined update indication setting determination unit, a combined update indication setting unit and a combined update initiation determination unit, wherein:

the combined update indication setting determination unit is used to acquire information from the combined update module and the CSFB module and to determine whether the terminal has performed combined update or CSFB attachment in an EPS network via E-UTRAN or not when the location area update module performs location area update to MSC/VLR via GERAN/UTRAN, if yes, then the combined update indication setting determination unit notifies the combined update indication setting unit;

the combined update indication setting unit is used to set a combined update indication which indicates the EPS network requires combined update when the terminal moves to the E-UTRAN if a notification is received from the combined update indication setting determination unit; and the combined update initiation determination unit is used to determine, in case the terminal moves to the E-UTRAN, whether the combined update indication which indicates the EPS network requires combined update when the terminal moves to the E-UTRAN has been set, if yes, then the combined update initiation determination unit notifies the combined update module to initiate a combined TA/LA Update to a MME.

Further, the foregoing method may also have the following features:

the combined update indication setting unit may set the combined update indication which indicates the EPS network requires combined update when the terminal moves to the E-UTRAN by using one or more new flags, or by expanding existing flags to include the combined update indication.

Further, the foregoing method may also have the following features:

the combined update initiation determination unit may determine whether the combined update indication which indicates the EPS network requires combined update has been set or not when the terminal moves to the E-UTRAN from the GSM/UMTS, if yes, then the terminal may initiate combined TA/LA Update to the MME, if not, the terminal may determine, based on other conditions, whether it is necessary to initiate combined TA/LA Update or not; or the combined update initiation determination unit firstly determines whether the current tracking area has been registered or not when the terminal moves to the E-UTRAN, if yes, then the combined update initiation determining unit may determine whether the combined update indication which indicates the EPS network requires combined update has been set or not, if yes, then the terminal may initiate combined TA/LA Update to the MME.

The present invention provides a method to update the SGs association (or re-establishes the SGs association) by setting the combined update indication which indicates the EPS network requires combined update by the UE during location area update. The method described in the present invention will not only solve the problem that the MSC/VLR may not find the UE via paging after the introduction of ISR function, but also realize an accurate judgment on the requirement for location update when the UE returns back to the E-UTRAN from the GSM/UMTS network after the UE falls back to the GSM/UMTS network and completes CS services, and guarantees the MSC/VLR can correctly execute CS paging and find the UE via paging under all circumstances. This method is simple and useful for the application of the CSFB function and the EPS network.

BRIEF DESCRIPTION OF THE DRAWINGS

The drawings described here are intended to provide further and better understanding of the present invention and constitute a part of the application. The illustrative embodiments of the present invention and their descriptions are used to explain the present invention and don't constitute any improper limitation to the present invention. In which.

DETAILED DESCRIPTION

Detailed descriptions will be made on the specific embodiment of the present invention hereinafter with reference to the accompanying drawings.

In the embodiments of the present invention, a method of a terminal (UE) determining a requirement for initiating combined TA/LA Update is provided. This method is used to initiate a combined update procedure to update SGs association information when the terminal moves from a GSM/UMTS network to an E-UTRAN, thereby achieving that MSC/VLR can correctly execute CS service paging to the UE.

Figure 3:
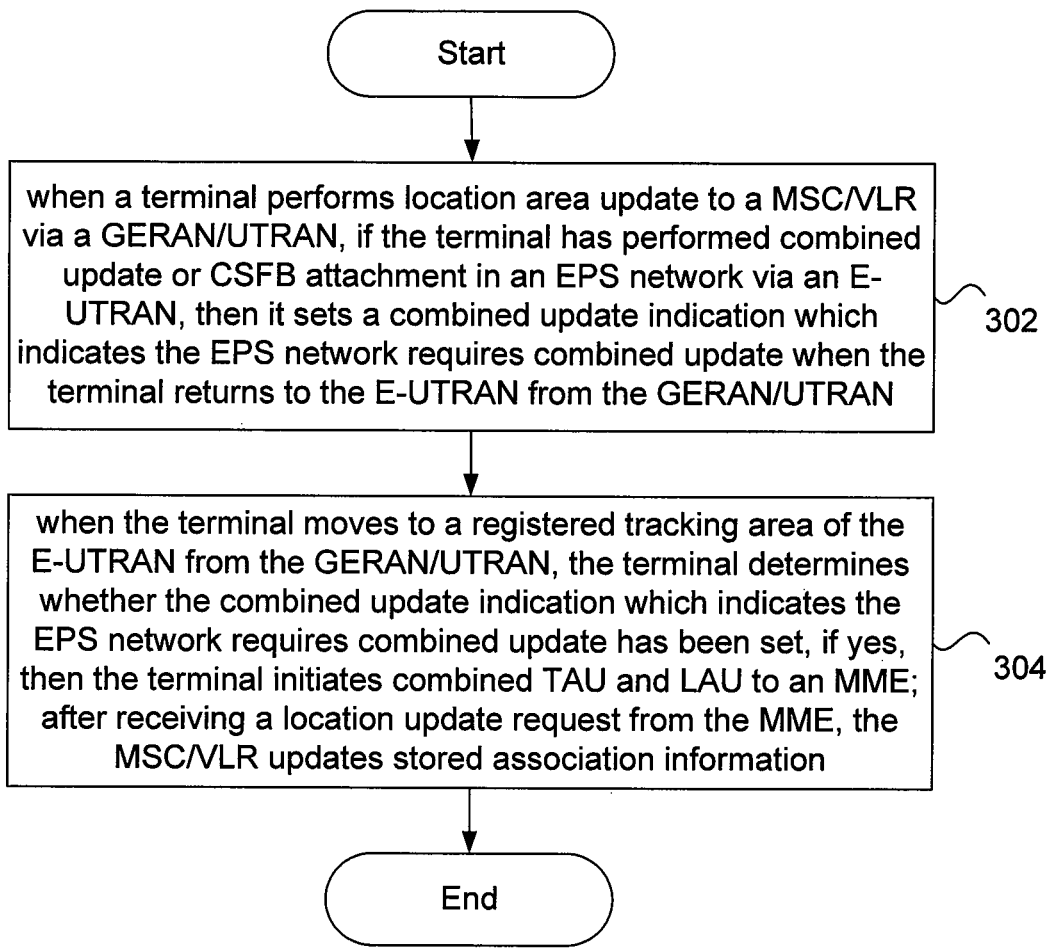
FIG. 3 is a flow chart based on an embodiment of the present invention.

FIG. 3 is a flow chart illustrating a method for SGs association update in the embodiment. As shown in FIG. 3, this flow comprises:

step 302: when a terminal performs location area update to the MSC/VLR via the GERAN/UTRAN, if the terminal has performed combined update or CSFB attachment in the EPS network, then the terminal sets combined update indication which indicates the EPS network requires combined update when the terminal returns to E-UTRAN;

when the step 302 is executed, the terminal may set the combined update indication which indicates the EPS network requires combined update when it sends a location area update request message or after it receives a location area update acceptance message;

when the step 302 is executed, methods by which the terminal sets the combined update indication, which indicates the EPS network requires combined TA/LA Update when the terminal returns to LTE access network (it is also shortened as requires combined update), can be: (1) by expanding existing flags to include the combined update indication; (2) by using one or more new flags (e.g. one flag indicating that ISR is deactivated and combined update is required, and the other flag indicates reason, realization method, etc.) to indicate that combined update is required when the terminal moves from the GSM/UMTS network to the E-UTRAN; and step 304: when the terminal moves to a registered tracking area of the E-UTRAN, it determines whether the combined update indication which indicates the EPS network requires combined update has been set or not, if yes, then the terminal initiates combined TA/LA Update to a MME; after the MSC/VLR receives a location update request message from the MME, then the MSC/VLR updates the stored association information and create or re-establishes a SGs association with the MME.

There are two options for the specific realization:

when the terminal moves to the E-UTRAN, it determines whether the combined update indication which indicates the EPS network requires combined update has been set or not, if yes, then the terminal initiates combined TA/LA Update to the MME, if not, then the terminal based on other conditions, e.g. tracking area having been registered or not, determines whether it is necessary to initiate combined TA/LA Update or not; or when the terminal moves to the E-UTRAN, firstly it determines whether the current tracking area has been registered or not, if yes, then the terminal determines whether the combined update indication which indicates the EPS network requires combined update has been set or not, if the combined update indication has been set, then the terminal initiates combined TA/LA Update to the MME.

Accordingly, the terminal which supports present invention in this embodiment further comprises a control module for association update, in addition to a location area update module, a combined update module, a CSFB module and an activated ISR module. The control module for association update further comprises a combined update indication setting determination unit, a combined update indication setting unit and a combined update initiation determining unit:

the combined update indication setting determination unit is used to acquire information from the combined update module and the CSFB module, and to determine whether the terminal has performed combined update or CSFB attachment in the EPS network via the E-UTRAN; when the location area update module performs location area update to MSC/VLR via the GERAN/UTRAN, if it has performed combined update or CSFB attachment in the E-UTRAN, then the combined update indication setting determination unit notifies the combined update indication setting unit;

the combined update indication setting unit is used to set the combined update indication which indicates the EPS network requires combined update if a notification is received from the combined update indication setting determination unit; specifically, it may be realized by expanding existing flags to include the combined update indication, or using one or more new flags to indicate that combined update is required when the terminal moves from the GSM/UMTS network to the E-UTRAN; and the combined update initiation determination unit is used to determine, in case the terminal moves to the E-UTRAN, whether the combined update indication which indicates the EPS network requires combined update has been set. If yes, then the combined update initiation determination unit initiates the combined TA/LA Update to the MME. The concrete determining method adopted by the combined update initiation determining unit may refer to the step 304 in the method flow description.

The processing flow of a concrete application of the present invention will be described in detail below with reference to FIG. 2 and FIG. 4.

Figure 1:
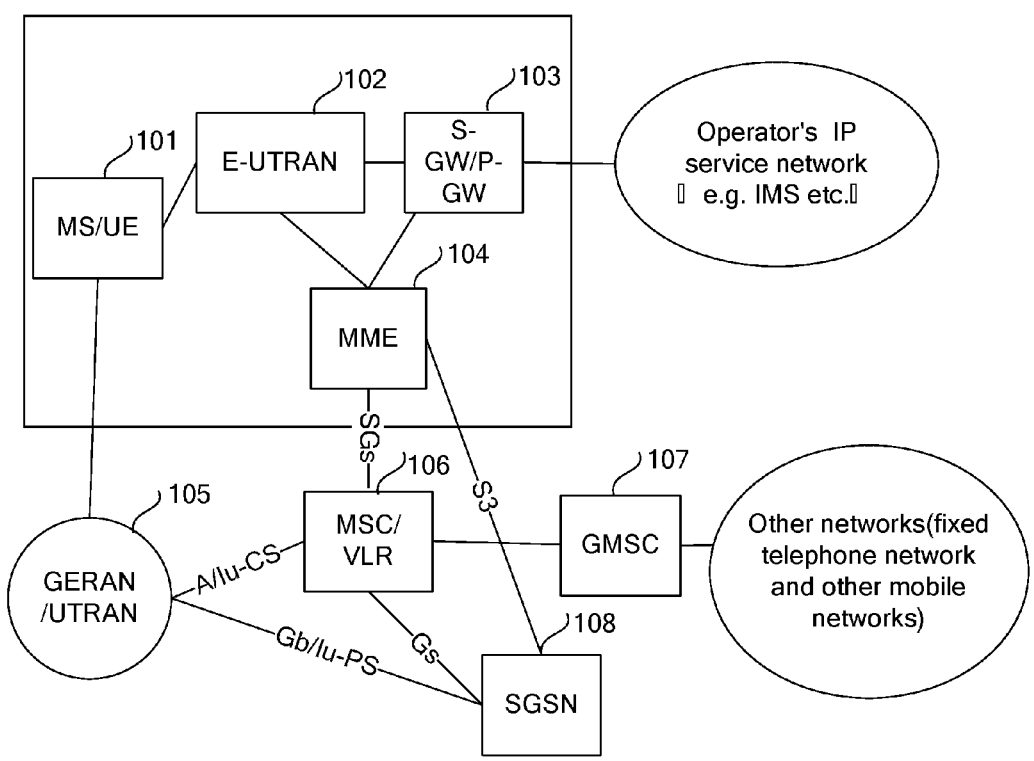
FIG. 1 is an architecture schematic of networks to which the present invention is applied.
Figure 2:
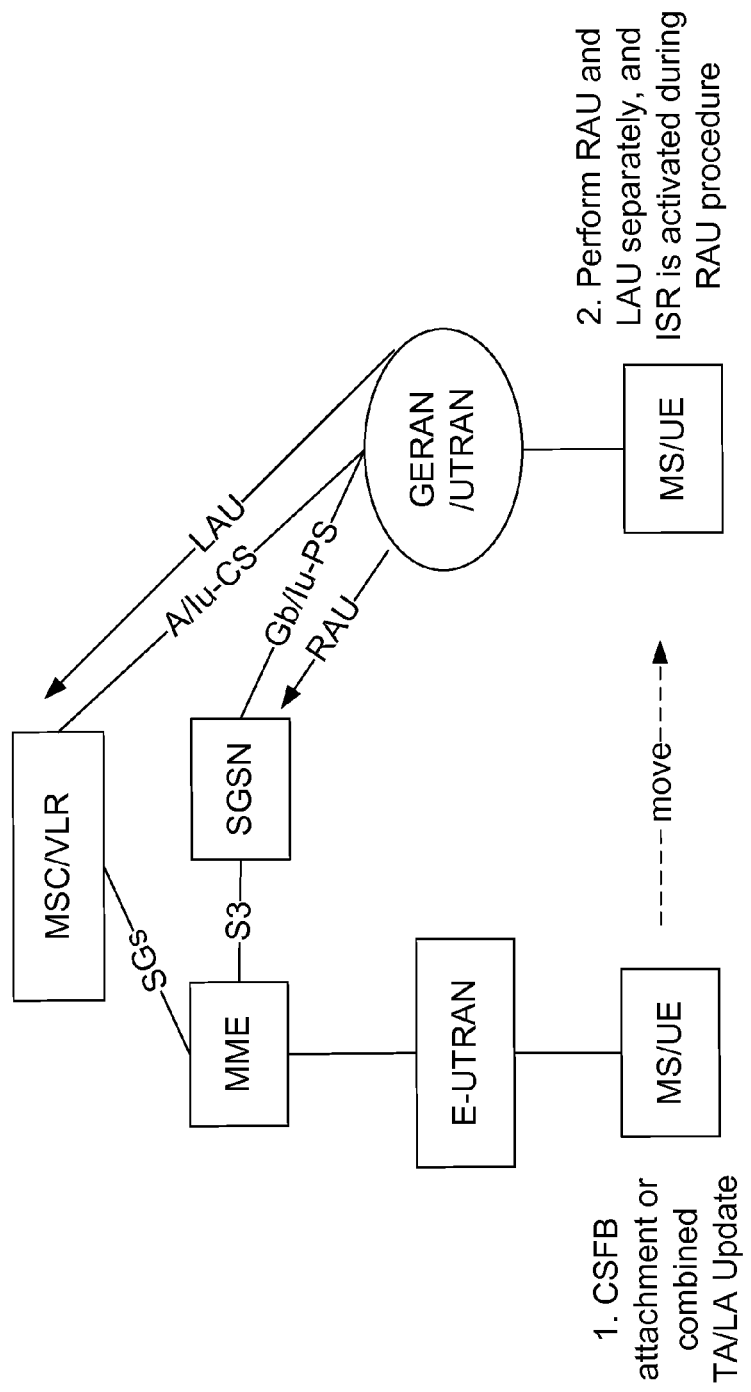
FIG. 2 is a scenario schematic illustrating problems of the current technology during MSC/VLR paging a UE when SGs interface is supported but Gs interface is not supported in the case that ISR is activated.

The processing flow of the present invention being applied to the scenario as shown in FIG. 2 is as follows:

in the first step as shown in FIG. 2, the UE firstly performs CSFB attachment or combined TA/LA Update in the EPS network. When this procedure ends, the UE sets that the registration and update has been completed in the E-UTRAN, and stores tracking area list information generated by the MME, and the UE knows that combined update is successful. When the UE camps on the E-UTRAN and the MSC/VLR requires paging the UE, CS paging will be executed via the SGs interface based on SGs association information in the MSC/VLR;

in the second step as shown in FIG. 2, when the UE moves from the E-UTRAN to the GSM/UMTS, and sends a LAU request message to the MSC/VLR or receives a LAU acceptance message from the MSC/VLR, the UE sets combined update indication which indicates combined update is required when moving to the E-UTRAN; when the UE is in the GSM/UMTS network, the MSC/VLR can find the UE through paging via A/Iu-CS interface in the GSM/UMTS when the MSC/VLR requires paging the UE;

subsequently, when the UE moves from the GSM/UMTS to the E-UTRAN, the UE determines, based on the combined update indication, that combined TA/LA Update is required, then the UE sends a combined update request to the MME, the MME sends a location update request to the MSC/VLR, and the MSC/VLR establishes SGs association after receiving the location update request from the MME; and subsequently, when the UE camps on the E-UTRAN and the MSC/VLR requires CS services paging, the MSC/VLR can send paging to the UE via the SGs interface based on the SGs association.

Figure 4:
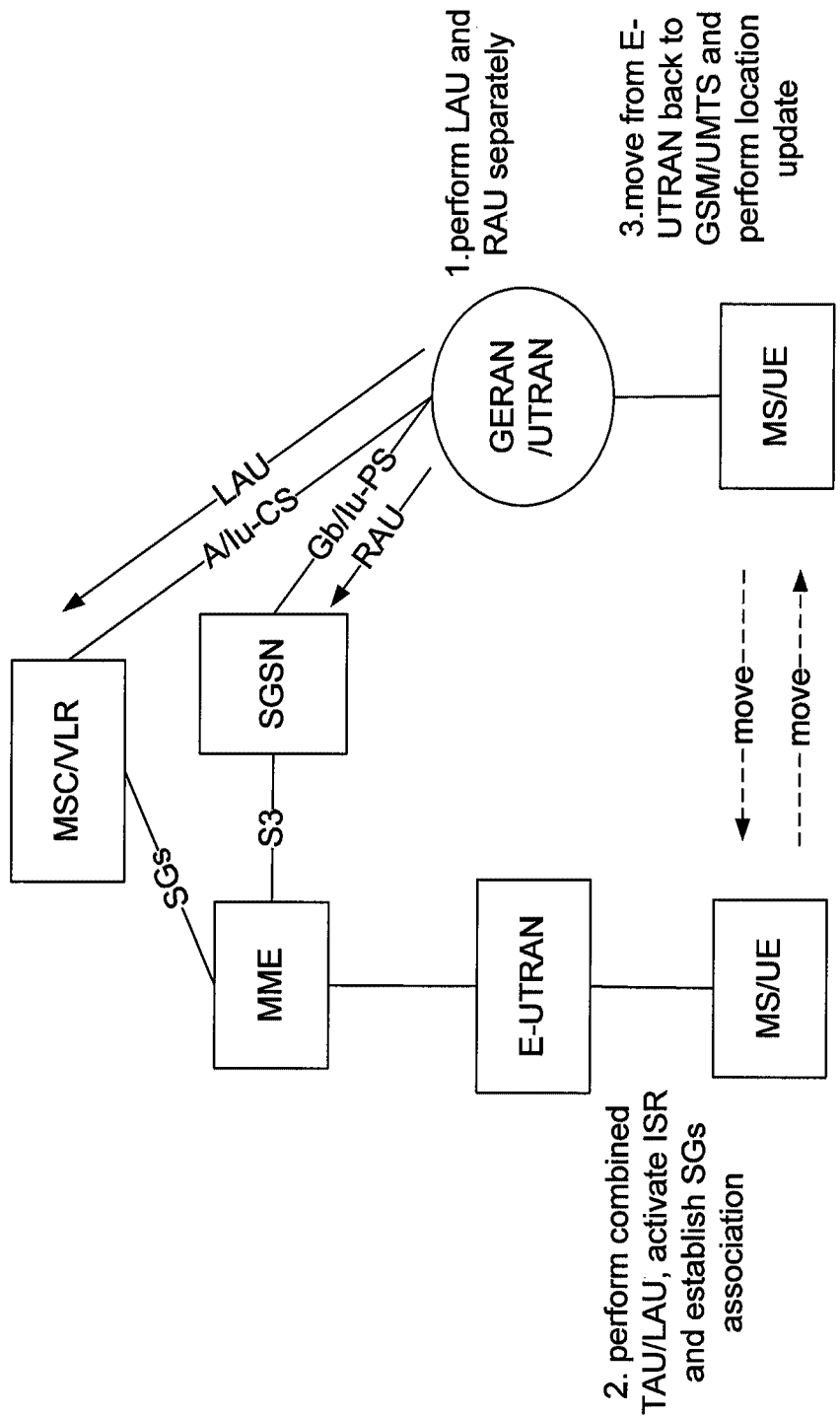
FIG. 4 is another flow chart illustrating the embodiment of the present invention being applied to the network deployment scenario as shown in FIG. 2.
Figure 5:
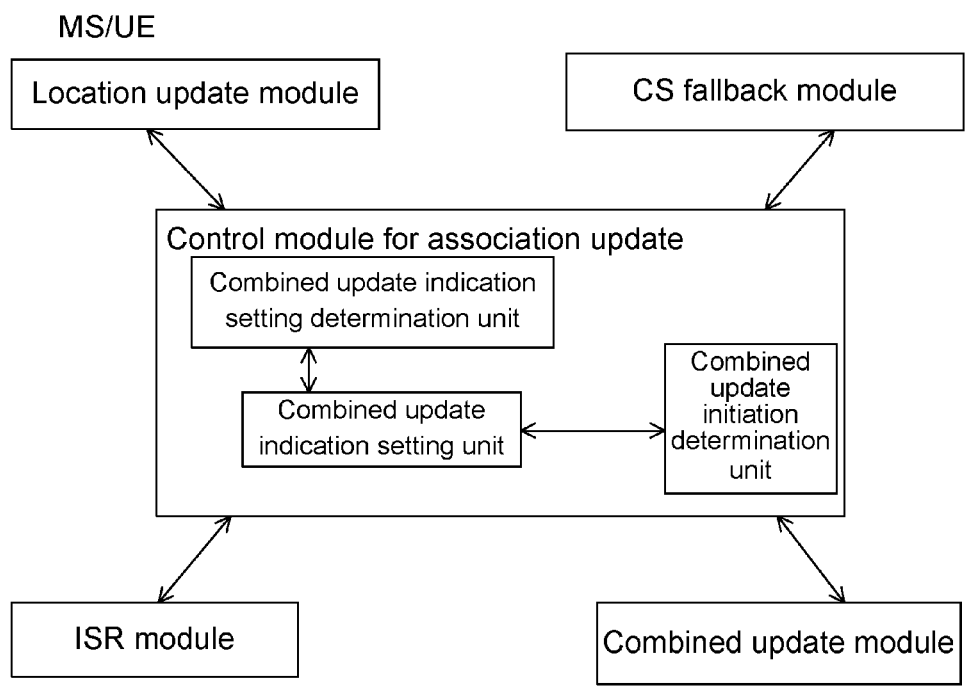
FIG. 5 illustrates a structure of a terminal for association update.

FIG. 4 is another flow under the network deployment scenario as shown in FIG. 2. What is different from the flow as shown in FIG. 2 is that, the UE camps on the GSM/UMTS network first, and when the UE camps on the EPS network via the E-UTRAN, the ISR function is activated. The processing of the present invention under the flow as shown in FIG. 4 is described as below:

in the first step as shown in FIG. 4, the UE firstly performs the RAU and the LAU separately via the GSM/UMTS network, after these procedures are completed, the UE will set that it has been registered separately in the CS domain and the PS domain of the GSM/UMTS network; when the UE is in the GSM/UMTS network and the MSC/VLR requires paging the UE, the UE may be found through paging via the A/Iu-CS interface;

in the second step as shown in FIG. 4, the UE moves from the GSM/UMTS to the E-UTRAN and performs the combined TA/LA Update, when this procedure is completed, the UE sets that it has been registered in the EPS network and stores the tracking area list information generated by the MME; the UE knows combined update is successful, moreover, as the terminal and networks support the ISR function, the ISR is activated and the registration information of the UE in the PS domain of the GSM/UMTS network remains stored valid. When the UE camps on the E-UTRAN and the MSC/VLR requires paging the UE, CS paging will be executed via the SGs interface based on the SGs association information;

in the third step as shown in FIG. 4, the UE moves from the E-UTRAN to the GSM/UMTS network again, and may perform a LAU procedure; when the UE performs the LAU procedure, sends a LAU request message to the MSC/VLR or receives a LAU acceptance message from the MSC/VLR, the UE sets combined update indication which indicates combined update is required when the UE moves to the E-UTRAN; if the UE does not perform the LAU procedure, the foregoing process for setting the combined update indication will not be executed; in this case, as the LAU procedure is not executed, the SGs association in the MSC/VLR will not be deleted, subsequently, when the UE camps on the E-UTRAN, there will be no problem when the MSC/VLR performs CS paging; and subsequently, when the UE moves from the GSM/UMTS to the E-UTRAN, the UE determines, based on the combined update indication which indicates the EPS network requires combined update, whether combined TA/LA Update is required or not, if yes, then the UE sends a combined update request to the MME, and the MSC/VLR establishes SGs association after receiving the location update request from the MME; when the MSC/VLR requires CS service paging, the MSC/VLR sends CS paging to the UE via the SGs interface based on the SGs association.

As described in the foregoing flows shown in FIG. 2 and FIG. 4, the problems the MSC/VLR faces when it executes CS service paging under the network scenario as shown in FIG. 2 can be solved by using the present invention.

Further, the present invention may also be applied to another scenario of CSFB. In the current technology, when the UE receives CS paging from the MSC/VLR via the SGs association, falls back to the CS domain of the GSM/UMTS network and executes a call or supplementary services after CSFB attachment or combined TA/LA Update, the UE may perform a location area update in the case that the location area information currently stored in the UE is different from the location area information of the network, or there is a MSC change. If the network or the terminal does not support combined RA/LA Update, then the MSC/VLR receives the LAU request from the GERAN/UTRAN via the A/Iu-CS interface. In the procedure of receiving the LAU request from the A/Iu-CS interface and performing location area update, the MSC/VLR will delete the SGs association. In the process of CSFB, it may not be necessary for the UE to perform a location area update procedure, or the location area update is completed through combined RA/LA Update.

When the CS services ends in the GSM/UMTS and the UE returns back to the E-UTRAN, if the UE has performed location area update during the CS fallback procedure but this location area update is not combined RA/LA Update, then combined TA/LA Update is required to update the SGs association, otherwise there will be no need for combined TA/LA Update. In the current technology, no method is provided to indicate how the UE acquires information about a requirement for combined TA/LA Update.

When the present invention is applied to the foregoing scenario, during CSFB procedure, the UE sets the combined update indication which indicates the EPS network requires combined update when/after it sends a location area update request to the MSC/VLR or receives a location area update acceptance message from the MSC/VLR. If the UE does not perform the LAU procedure, then the foregoing process for setting the combined update indication is not required; and when the CS service ends in the GSM/UMTS network and the UE returns back to the E-UTRAN, the UE determines based on the combined update indication whether combined update is required or not; if yes, then the UE initiates combined TA/LA Update, the MSC/VLR receives the location update request message from the MME and establishes new association with the MME.

Subsequently, when the MSC/VLR needs to do CS service paging, the MSC/VLR sends paging to the UE via the SGs interface based on SGs association information.

To summarize, the method adopted by the present invention not only solves the problem that the MSC/VLR may not find the UE via paging after the introduction of the ISR function, but also realizes an accurate judgment on the requirement for association update (or re-establishment) when the UE returns back from the GSM/UMTS network to the E-UTRAN after the UE falls back to the GSM/UMTS network and completes CS services, guarantees that the MSC/VLR can correctly execute CS paging and find the UE via paging under all circumstances and reduces unnecessary update procedures. This method is simple and useful for the application of the CSFB function and the EPS network.

The foregoing descriptions are just a preferred embodiment of the present invention but are not used to limit the present invention. For those skilled in the art, various changes and modifications may be made to the present invention. Any change, equivalent substitute or modification without departing from the spirit and principle of the present invention shall be included in the protection scope of the present invention.

Certainly, the present invention may also have other embodiments, those skilled in the art may make corresponding changes and alterations based on the present invention, however, these changes and alterations all shall be within the protection scope of the claims attached to the present invention and shall not depart from the spirit and essence of the present invention.

Industrial Applicability

The present invention updates the SGs association (or re-establishes the SGs association) by setting a combined update indication, during location area update, which indicates the EPS network requires combined update when the terminal returns to the E-UTRAN from the GERAN/UTRAN. This method not only solves the problem that the MSC/VLR may not find the UE via paging after the introduction of the ISR function, but also realizes an accurate judgment on the requirement for association update when the UE returns back from a GSM/UMTS network to the E-UTRAN after the UE falls back to the GSM/UMTS network, and guarantees that the MSC/VLR can correctly execute CS paging and find the UE via paging under all circumstances. This method is simple and useful for the application of the CSFB function and the EPS network.

What is claimed is:

1. A method for association update, comprising:
   when a terminal performs Location Area Update (LAU) to a Mobile Switching Center/Visitor Location Register (MSC/VLR) via a Global System for Mobile Communications Enhanced Data Rate for GSM Evolution Radio Access Network/Universal Mobile Telecommunication System Terrestrial Radio Access Network (GERAN/UTRAN), if the terminal has performed combined update or Circuit Switching Fallback (CSFB) attachment in an Evolved Packet System (EPS) network via an Evolved UTRAN (E-UTRAN), then the terminal setting a combined update indication which indicates the EPS network requires combined update when the terminal returns to the E-UTRAN from the GERAN/UTRAN; and
   when the terminal moves to a registered tracking area of the E-UTRAN from the GERAN/UTRAN, the terminal determining whether the combined update indication which indicates the EPS network requires combined update has been set, if yes, then the terminal initiating combined Tracking Area (TA)/Location Area(LA) Update to a Mobility Management Entity (MME), after receiving a location update request from the MME, the MSC/VLR updating stored association information and re-establishing SGs association with the MME, so that the terminal can receive a Circuit Switching (CS) service while camping in the E-UTRAN;
   wherein the terminal, a Global System for Mobile Communication (GSM)/Universal Mobile Telecommunication System (UMTS) and the EPS network all support idle-mode Signaling Reduction (ISR) function, and the ISR activated;
   SGs interface is supported between the MSC/VLR and the MME;
   Gs interface is not supported between the MSC/VLR and a Serving GPRS Support Node (SGSN), and/or the terminal does not support combined Routing Area (RA)/LA Update.

2. The method according to claim 1, wherein when sending a location area update (LAU) request message or after receiving a LAU acceptance message, the terminal sets the combined update indication which indicates the EPS network requires combined update when the terminal returns to the E-UTRAN from the GERAN/UTRAN.

3. The method according to claim 1, wherein the terminal sets the combined update indication which indicates the EPS network requires combined update when the terminal returns to the E-UTRAN from the GERAN/UTRAN by using one or more new flags; or by expanding existing flags to include the combined update indication.

4. The method according to claim 1, wherein before the terminal performs the LAU, the terminal sets that it has completed registration and update in the EPS network after completing CSFB attachment or combined TA/LA Update in the EPS network, and stores tracking area list information generated by the MME; and
   after the terminal moves from the E-UTRAN to the GSM/UMTS, it performs the LAU to the MSC/VLR via the GERAN/UTRAN.

5. The method according to claim 1, wherein before the terminal performs the LAU, the terminal completes CSFB attachment or combined TA/LA Update in the EPS network via the E-UTRAN; and
   subsequently, if the terminal falls back to Circuit Switching (CS) domain of the GSM/UMTS network due to receiving CS service paging from the MSC/VLR via the SGs interface, and if the terminal needs to perform the LAU after falling back to the CS domain, the terminal performs the LAU to the MSC/VLR via the GERAN/UTRAN.

6. The method according to claim 1, wherein when the terminal moves to the E-UTRAN from the GERAN/UTRAN, it determines whether the combined update indication which indicates the EPS network requires combined update when the terminal moves to the E-UTRAN has been set or not, if yes, then the terminal initiates combined TA/LA to the MME; if not, then the terminal determines, based on other conditions, whether it is necessary to initiate combined TA/LA Update or not; or
   when the terminal moves to the E-UTRAN from the GERAN/UTRAN, firstly it determines whether the current tracking area has been registered or not, if the tracking area has been registered, then the terminal determines whether the combined update indication which indicates the EPS network requires combined update when the terminal returns to the E-UTRAN from the GERAN/UTRAN has been set or not, if the combined update indication has been set, then the terminal initiates combined TA/LA Update to the MME.

7. A terminal for association update, comprising a Location Area Update (LAU) module, a combined update module, a Circuit Switching Fallback (CSFB) module and an Idle-mode Signaling Reduction (ISR) module, and the ISR module is activated, the terminal also comprising a control module for association update, the control module for association update further comprises a combined update indication setting determination unit, a combined update indication setting unit and a combined update initiation determination unit:
   the combined update indication setting determination unit is used to acquire information from the combined update module and the CSFB module and to determine whether the terminal has performed combined update or CSFB attachment in an Evolved Packet System (EPS) network via Evolved Universal Mobile Telecommunication System Terrestrial Radio Access Network (E-UTRAN) or not when the LAU module performs LAU to Mobile Switching Center/Visitor Location Register (MSC/VLR) via Global System for Mobile Communications Enhanced Data Rate for GSM Evolution Radio Access Network/Universal Mobile Telecommunication System Terrestrial Radio Access Network (GERAN/UTRAN), if the UE has performed that, then the combined update indication setting determination unit notifies the combined update indication setting unit;

the combined update indication setting unit is used to set a combined update indication which indicates the EPS network requires combined update when the terminal moves to the E-UTRAN if a notification is received from the combined update indication setting determining unit; and the combined update initiation determination unit is used to determine, in case the terminal moves to the E-UTRAN, whether the combined update indication which indicates the EPS network requires combined update when the terminal moves to the E-UTRAN has been set, if yes, then the combined update initiation determination unit notifies the combined update module to initiate a combined Tracking Area (TA)/Location Area (LA) Update to an Mobility Management Entity (MME), so that the terminal can receive a Circuit Switching (CS) service while camping in the E-UTRAN;

wherein the terminal, a Global System for Mobile Communication (GSM)/Universal Mobile Telecommunication System (UMTS) and the EPS network all support idle-mode Signaling Reduction (ISR) function, and the ISR is activated;

SGs interface is supported between the MSC/VLR and the MME;

Gs interface is not supported between the MSC/VLR and a Service GPRS Support Node (SGSN), and/or the terminal does not support combined Routing Area (RA)/LA Update.

8. The terminal according to claim 7, wherein the combined update indication setting unit sets the combined update indication which indicates the EPS network requires combined update when the terminal moves to the E-UTRAN by using one or more new flags, or by expanding existing flags to include the combined update indication.

9. The terminal according to claim 8, wherein the combined update initiation determination unit determines whether the combined update indication which indicates the EPS network requires combined update has been set or not when the terminal moves to the E-UTRAN from the Global System for Mobile Communication (GSM)/Universal Mobile Telecommunication System (UMTS), if the combined update indication has been set, then the terminal initiates combined TA/LA Update to the MME; or the combined update initiation determination unit firstly determines whether the current tracking area has been registered or not when the terminal moves to the E-UTRAN, if the tracking area has been registered, then it subsequently determines whether the combined update indication has been set or not, if the indication information has been set, then the terminal initiates combined TA/LA Update.

10. The terminal according to claim 7, wherein the combined update initiation determination unit determines whether the combined update indication which indicates the EPS network requires combined update has been set or not when the terminal moves to the E-UTRAN from the Global System for Mobile Communication (GSM)/Universal Mobile Telecommunication System (UMTS), if the combined update indication has been set, then the terminal initiates combined TA/LA Update to the MME; or the combined update initiation determination unit firstly determines whether the current tracking area has been registered or not when the terminal moves to the E-UTRAN, if the tracking area has been registered, then it subsequently determines whether the combined update indication has been set or not, if the indication information has been set, then the terminal initiates combined TA/LA Update.

* * * * *

UNITED STATES PATENT AND TRADEMARK OFFICE
CERTIFICATE OF CORRECTION

PATENT NO. : 8,718,653 B2  Page 1 of 1
APPLICATION NO. : 13/002759
DATED : May 6, 2014
INVENTOR(S) : Hu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 169 days.

Signed and Sealed this
Twenty-ninth Day of September, 2015

Michelle K. Lee
*Director of the United States Patent and Trademark Office*